United States Patent [19]
Landsman

[11] 3,816,659
[45] June 11, 1974

[54] SCANNING APPARATUS

[75] Inventor: Robert M. Landsman, Norwalk, Conn.

[73] Assignee: The Perkin-Elmer Corporation, Norwalk, Conn.

[22] Filed: Oct. 13, 1972

[21] Appl. No.: 297,255

[52] U.S. Cl. .................... 178/7.6, 178/7.6, 178/7.1, 178/7.1 E, 178/6.7, 178/DIG. 27
[51] Int. Cl. .............................................. H04n 3/00
[58] Field of Search ............. 178/7.1, DIG. 027, 6.7, 178/7.6, 7.1 E

[56] References Cited

UNITED STATES PATENTS

| | | | |
|---|---|---|---|
| 1,661,167 | 3/1928 | Clark et al. | 178/6.7 |
| 2,394,649 | 2/1946 | Young | 178/7.1 |
| 2,532,799 | 12/1950 | Young | 178/7.1 |
| 2,569,648 | 10/1951 | Artzt et al. | 178/7.1 |
| 3,622,222 | 11/1971 | Remy et al. | 350/7 |
| 3,622,690 | 11/1971 | Stephens | 178/5.2 R |
| 3,688,032 | 8/1972 | Dixon et al. | 178/7.6 |

*Primary Examiner*—Howard W. Britton
*Assistant Examiner*—Edward L. Coles
*Attorney, Agent, or Firm*—John K. Conant

[57] ABSTRACT

A simplified scanner for facsimile transmission. A cylindrical member supports the material to be scanned and a tubular member extends concentrically into the cylinder. A laser beam passes through the tubular member and is focused to a spot on the inner surface of the cylinder. Either the tubular member or the cylinder is caused to rotate about, and translate along, their common axis with the aid of air bearings. In this manner, spiral scanning is effected with only one moving member.

The foregoing abstract is not to be taken either as a complete exposition or as a limitation of the present invention. In order to understand the full nature and extent of the technical disclosure of this application, reference must be had to the following detailed description and the accompanying drawings as well as to the claims.

11 Claims, 6 Drawing Figures

SCANNING APPARATUS

BACKGROUND OF THE INVENTION

This invention relates to facsimile transmission apparatus of the type wherein a "reader" at one end of a transmission line scans a document and supplies electronic signals to a transmission line. A "writer" at the other end of the transmission line receives the signals and reproduces the scanned document.

The usual scanner utilized in systems of this type is a complex device. The reader, for example, will customarily include a cylindrical drum. The document to be scanned is secured to the outer surface of the drum. As the drum rotates, a scanning head is caused to traverse its length. This type of construction requires a number of moving parts, such as lead screws, gear trains, and clutches. The moving parts may be required to drag wires and hoses.

It is an object of this invention to provide a scanning device which is of much simpler construction and has, in fact, only one moving part. Other objects, features, and advantages will become apparent from the following description and appended claims.

SUMMARY OF THE INVENTION

Scanning apparatus for a facsimile transmission system which comprises a cylindrical member for supporting the material to be scanned. An elongated scanning member is positioned concentrically within the cylindrical member and has a first end outside the cylinder and a second end inside the cylinder. Means are provided for passing collimated radiation along the scanning member from its first to its second end. Mounted on the second end of the scanning member are means for focusing the radiation on the surface of the cylinder. Means are provided for moving only one of the cylinder and scanning member to create relative rotation about, and relative translation along, their common axis. Means are also provided for creating an output signal which is encoded with the relative positions of the cylinder and the scanning member.

DESCRIPTION OF THE PREFERRED EMBODIMENTS

Figure 1:
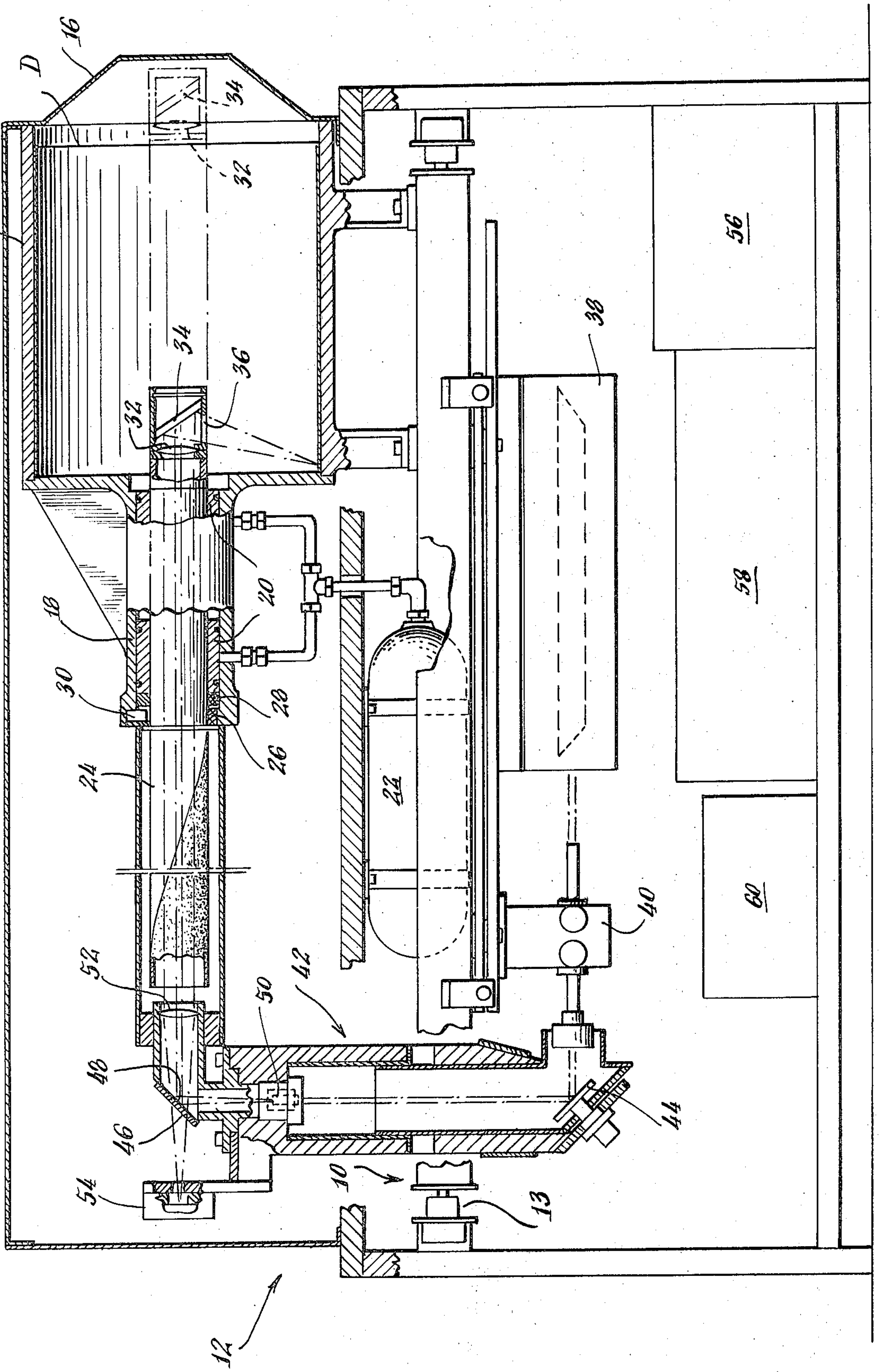
FIG. 1 is an elevational view, partially in cross section, of a reader, or writer, constructed in accordance with this invention.

In FIG. 1 there is illustrated a reader constructed in accordance with the invention mounted on a base 10 which is supported in a housing 12 by means of shock mounts 13. The reader comprises an enlarged cylindrical member 14 closed by an access door 16 at one end.

A reduced diameter bearing housing 18 extends from the other end of the cylinder and supports therein a pair of conventional air bearings 20 which are supplied with compressed air from a ballast tank 22 to which the compressed air is pumped from a suitable source (not shown). The ballast tank 22 serves to take out pulsations in the air supply and to provide a continuing air supply in case of supply pump stoppage or intermittent operation of the air supply pump.

Supported in the air bearings 20 is a tubular scanning member 24. An electrical winding 26 carried by housing 18 forms with scanning member 24 an eddy current motor causing rotation. A second electrical winding 28 forms with the scanning member 24 a linear induction motor causing translation. An optical pickup 30 is carried by housing 18 for providing positional data from the scanning member, as will be hereinafter explained.

One end of the scanning member extends within the cylinder 14 and carries a lens 32 and an angled mirror 34. A sidewall of the scanning member defines a window 36. A laser 38 is mounted on base 10 with its beam directed through a modulator 40, such as an acoustic modulator, and into the lower end of a vertical light tunnel assembly 42. At the lower end of light tunnel assembly 42 is mounted an angled mirror 44. At the upper end is an angled window 46, upon which is centrally mounted a small mirror 48. Along the axis between mirror 44 and window 46 is a beam expander 50. At the exit of assembly 42 and aligned with scanning mirror 24 is a collimating lens 52. Also mounted in alignment with lens 52, but on the opposite side of window 46, is an optical pickup 54. Mounted within the base are a laser power supply 56, a power amplifier 58, and a modulator driver 60.

Figures 2, 3, 4:
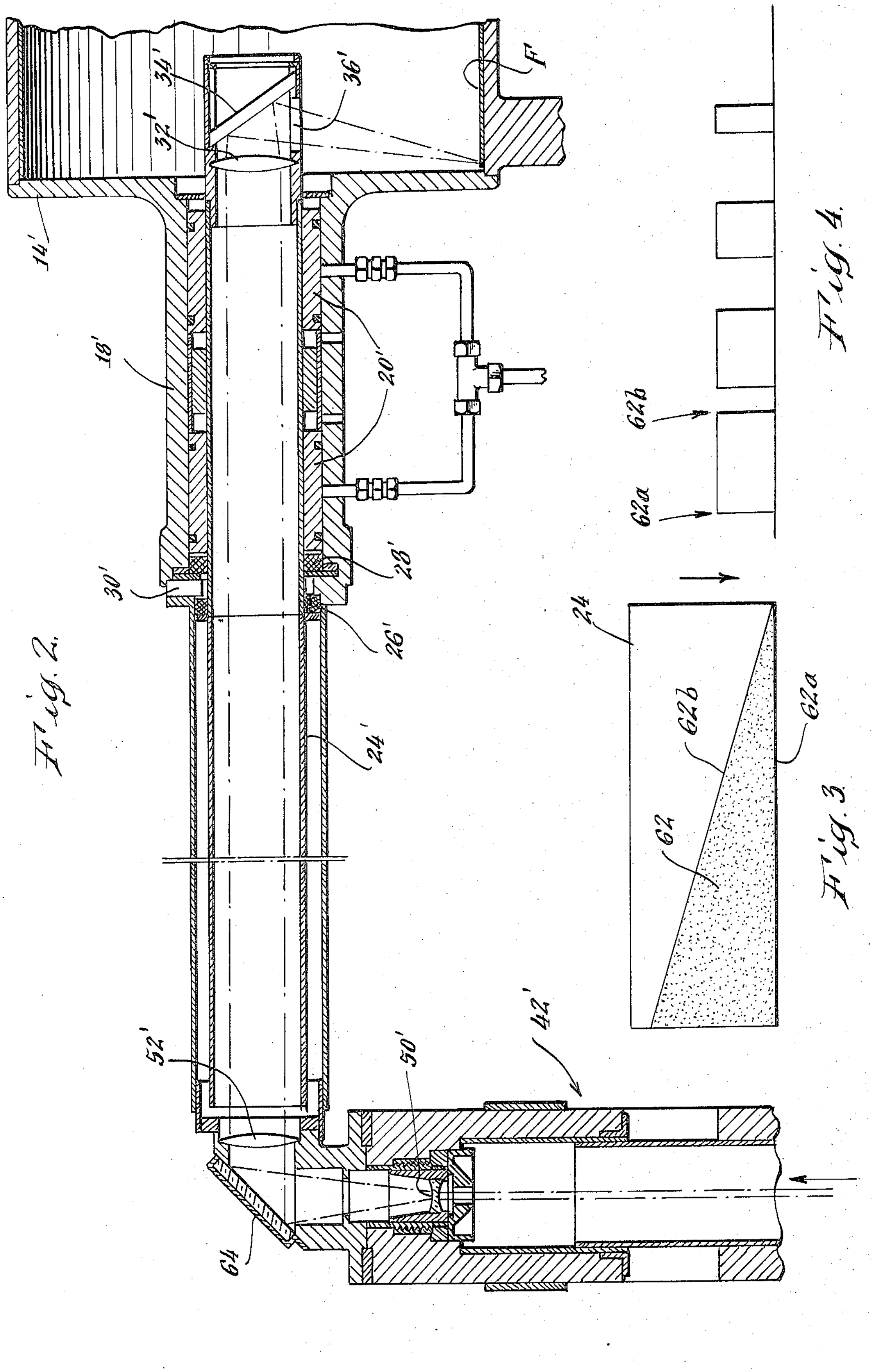
FIG. 2 is an enlarged cross sectional view of a portion of a writer constructed in accordance with this invention.
FIG. 3 is a layout of a portion of the movable member employed in the invention.
FIG. 4 illustrates the pulse train created by the pattern illustrated in FIG. 3.

FIG. 3 illustrates the scanning member 24 as it would appear if laid out flat. It carries on its outer surface a darkened triangle 62. With shaft rotation in the direction of the arrow, this forms a leading edge **62*a* and a trailing edge 62*b*.**

When it is desired to transmit a facsimile, the door 16 of cylinder 14 is opened and the document D to be transmitted is placed within the cylinder on its inner surface. Suitable means may be provided for holding the document in place. The narrow beam from laser 38 is deflected upwardly by mirror 44 in the light tunnel assembly 42.

When the apparatus shown in FIG. 1 is utilized as a reader, the modulator 40 is inactivated, and the power of the laser beam, from laser 38, is preferably reduced, so as to eliminate the possibility of scorching or otherwise damaging a document D in the cylinder 14 by reducing the power to the pump lamps of the laser or by introducing a neutral density filter in te optical path of the laser beam, for example.

Upon passing through the beam expander 50, the beam from the laser 38 is broadened slightly to fill the small mirror 48 and is then collimated by lens 52. The relatively narrow collimated beam passes through scanning member 24 and is refocussed by lens 32 onto the surface of the document. The radial shift in beam direction is provided by mirror 34 which redirects the beam through window 36. It will be noted from FIG. 1 that mirror 34 is not set at the usual 45° angle. In the illustrated embodiment, mirror 34 is set at an acute angle, other than 45°, to the horizontal axis. The angle is made other than 45° since at a 45° angle specular reflection from reflective material occasionally found in document paper might be reflected directly back to the laser 38 and shut it off. An angle of 52.5° is particularly suitable but the precise angle is not critical.

The diffuse reflection from the surface of the document is redirected by mirror 34 through the lens 32 where it is collimated. The collimated radiation returns to lens 52 where it is focused at the optical pickup 54 after passing through angled window 46.

The winding 26 causes the member 24 to rotate within the essentially frictionless air bearings 20, while winding 28 causes scanning member 24 to move linearly to the right. (Linear motion could also be pneumatically induced.) These two simultaneous motions result in the focal point of lens 32 making a spiral scan about the inside of the cylindrical member 14 while the member 24 moves to the position indicated by the dashed lines. The reflected radiation which is received by optical pickup 54 varies in intensity with the information content in the document to provide an output signal. This signal is supplied in the usual manner to a distant writer which will be described below.

A remote writer is suitably constructed in a fashion similar to the reader apparatus illustrated in FIG. 1, except that the modulator 40 is not utilized in apparatus for writing, as noted above; accordingly, the writing apparatus is not shown in detail. However, in FIG. 2, a modified portion of the writer is illustrated. Those parts which are similar to the reader are given the same reference numerals but with a prime attached. The primary distinction is that the beam expander 50' expands the laser beam slightly more than did expander 50. The expanded beam is redirected by a mirror 64 through the collimating lens 52' so that it substantially fills the scanning member 24'. It is then refocused and redirected by lens 32' and mirror 34' to the surface of a film F within cylinder 14'. The intensity of the laser beam is varied by the modulator 40 in accordance with the signals received from the optical pickup 54 in the reader. At the same time, the scanning member 24' is rotated and translated in synchronism with the scanning member 24 in the reader. The reader illustrated in FIG. 1 may be converted to a writer by replacing window 16 with a larger mirror.

Figure 5:
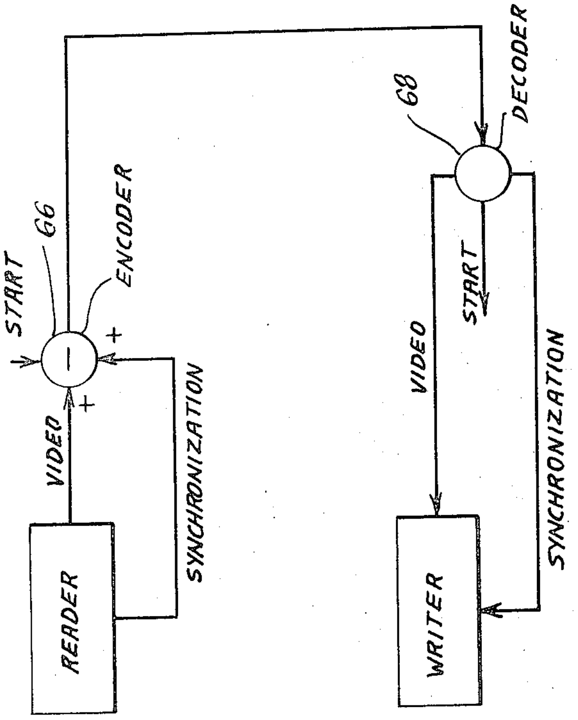
FIG. 5 is a block diagram illustrating the interconnections between the reader and the writer.

The manner in which synchronism of rotation and translation is achieved will be explained with reference to FIGS. 3 and 4. The optical pickup 30 in the reader is positioned to scan the shaded triangle 62 on the tubular surface. This produces a series of pulses as shown in FIG. 4. The leading edge of each pulse is produced by the leading edge **62*a* of the triangle. The spacing between the leading edge is, therefore, a measure of rotational speed. At constant speed these distances are equal. The length of each pulse, however, is a function of the position of the optical pickup 30 along the length of the shaded triangle. For a given linear position of the scanner, the length of the pulse is equal to the distance between the leading edge 62*a* of the triangle and its trailing edge 62*b*. As will be seen by reference to FIG. 5, this synchronization signal, together with the video signal from the pickup 54 and a "start" signal is transmitted by an encoder 66 to a decoder 68** at the writer. The synchronization signal is utilized at the writer to maintain it in synchronism, both rotationally and translationally, with the reader. This may be accomplished by a phase lock loop within the writer.

Because the air bearings are virtually frictionless, it is anticipated that the scanning members 24 in both reader and writer will rotate continuously. The "start" signal is, therefore, required to initiate the linear movement. Furthermore, the linear motions need not be in exact synchronism. If the linear speed of the writer is slightly less than that of the reader, there will be a corresponding shrinkage of the facsimile.

Figure 6:
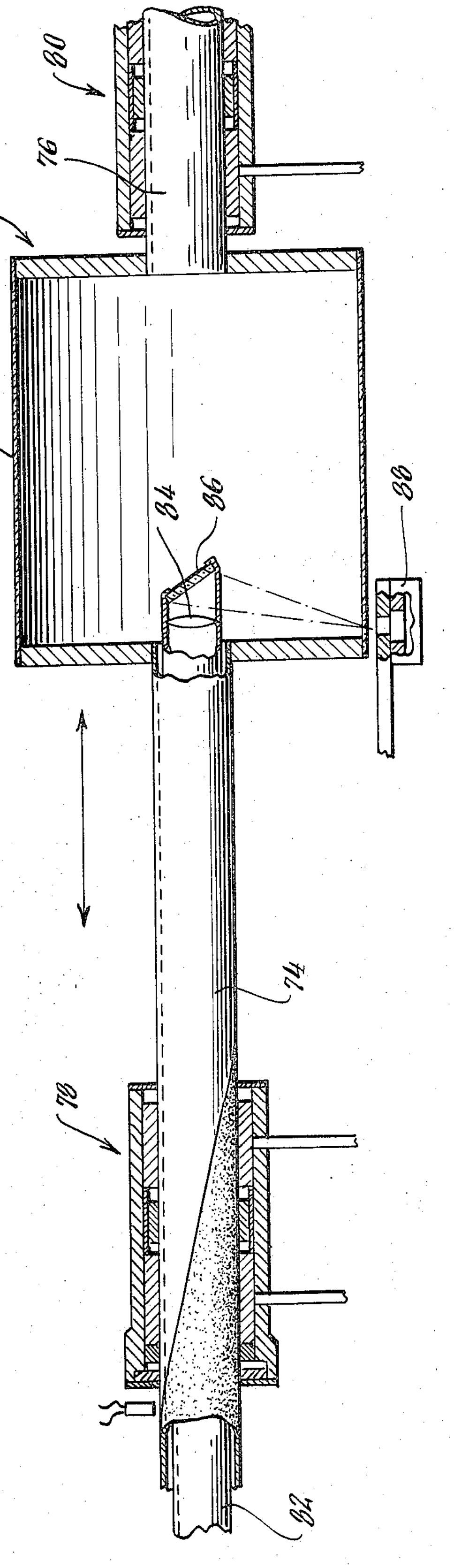
FIG. 6 is an elevational view in partial cross section of a modified version of the scanner of the invention.

In FIG. 6, there is illustrated a modification of this invention which is particularly useful for scanning transparencies. In this modification, a drum 70 having a transparent cylindrical surface 72 is mounted on tubular axles 74, 76 for rotation and translation within air bearings 78, 80. The transparency is mounted on surface 72. Laser light is brought to a focus on the surface of the cylinder by being passed through a stationary light tube 82 which carries a focusing lens 84 and mirror 86 at its end. Light passing through the transparency is detected by stationary pickup 88.

It will be apparent that the modification of FIG. 6 includes the same advantages as the previously described embodiments — namely, that of employing a single moving part while requiring no trailing hose, wires, or mechanical parts for achieving rotation and translation. It will also be apparent that a number of other variations and modifications may be made in this invention without departing from its spirit and scope. For example, a negative may be transmitted as a positive, or vice versa by simply reversing the visual signal. If the reader and the writer revolve in opposite directions, a mirror image results. Furthermore, it will be obvious that a single writer could transmit to a number of receivers. Accordingly, the foregoing description is to be construed as illustrative only, rather than limiting. This invention is limited only by the scope of the following claims.

I claim:

1. Scanning apparatus for a facsimile transmission system which comprises: a cylindrical member for supporting thereon material to be scanned; an elongated scanning member within, and concentric with, said cylindrical member and having a first end outside, and a second end inside, said cylindrical member; means for passing collimated radiation along said scanning member from its first to its second end; means carried by the second end of said scanning member for focusing said radiation on the surface of said cylindrical member; means for moving only one of said scanning and cylindrical members to create relative rotation about, and relative translation along, their common axis; and means for producing a position signal encoded with the relative positions of said cylindrical and scanning members comprising: a region on a surface of the one of said members that rotates relative to the other of said member, said region having a reflectivity differing from the remainder of said surface, an optical pickup mounted in relatively fixed position adjacent said surface for scanning said surface and producing signals when a portion of said region moves past the optical pickup, said region being shaped for said signals to indicate the relative rotational and translational position of said member that rotates, and means responsive to said signals for controlling said movement of said one of said scanning and cylindrical members.

2. The apparatus of claim 1 wherein said cylindrical member is stationary.

3. The apparatus of claim 1 wherein the one of said scanning and cylindrical members that is moved and translated axially is supported for such movements by air bearings.

4. The apparatus of claim 1 wherein said scanning member comprises: radiation detection means at said first end for receiving radiation reflected from the surface of said cylindrical member and producing electrical signals proportional to the intensity of the reflected radiation.

5. The apparatus of claim 4 wherein said radiation detection means comprises: a radiation transparent window; and a radiation detector positioned to receive reflected radiation passing through said window.

6. The apparatus of claim 1 wherein said scanning member is stationary and wherein said cylindrical member is transparent to said radiation and is moved to rotate relatively about and translate relatively along said common axis, said scanning member comprising stationary radiation detection means adjacent the external surface of said cylindrical member for receiving radiation passing (therethrough) through the cylindrical member and for producing electrical signals proportional to the intensity of such radiation.

7. The apparatus of claim 1 wherein said moving member has a tubular portion and said region is a triangular region on the surface of said tubular portion.

8. The apparatus of claim 1 wherein said means carried by the second end of said scanning member for focussing said radiation on the surface of said cylindrical member includes a mirror directing said collimated radiation angularly toward the surface of said cylindrical member from along the scanning member, said mirror being at an acute angle other than 45° relative to the axis of the portion of said collimated radiation passing along the scanning member to its second end.

9. Scanning apparatus for a facsimile transmission system which comprises: a cylindrical member for supporting thereon material to be scanned; an elongated scanning member within, and concentric with, said cylindrical member and having a first end outside, and a second end inside, said cylindrical member; means for passing collimated radiation along said scanning member from its first to its second end; means carried by the second end of said scanning member for focusing said radiation on the surface of said cylindrical member; means for moving only one of said scanning and cylindrical members to create relative rotation about, and relative translation along, their common axis; and means for producing a position signal encoded with the relative positions of said cylindrical and scanning members; said cylindrical member being stationary and said position signal producing means comprising a triangular region on the surface of said tubular scanning member having a reflectivity differing from the remainder of said surface; and optical pickup means adjacent said region.

10. Scanning apparatus for a facsimile transmission system which comprises: a cylindrical member for supporting thereon material to be scanned; an elongated scanning member within, and concentric with, said cylindrical member and having a first end outside, and a second end inside, said cylindrical member; means for passing collimated radiation along said scanning member from its first to its second end; means carried by the second end of said scanning member for focusing said radiation on the surface of said cylindrical member; means for moving only one of said scanning and cylindrical members to create relative rotation about, and relative translation along, their common axis; and means for producing a position signal encoded with the relative positions of said cylindrical and scanning members; said scanning member being rotated about said axis by means of an eddy current motor formed by an electrical winding axially around the scanning member.

11. Scanning apparatus for a facsimile transmission system which comprises: a cylindrical member for supporting thereon material to be scanned; an elongated scanning member within, and concentric with, said cylindrical member and having a first end outside, and a second end inside, said cylindrical member; means for passing collimated radiation along said scanning member from its first to its second end; means carried by the second end of said scanning member for focusing said radiation on the surface of said cylindrical member; means for moving only one of said scanning and cylindrical members to create relative rotation about, and relative translation along, their common axis, and means for producing a position signal encoded with the relative positions of said cylindrical and scanning members; said scanning member being translated along said axis by means of a linear induction motor formed by winding axially around the scanning member.

* * * * *